Figure 1:
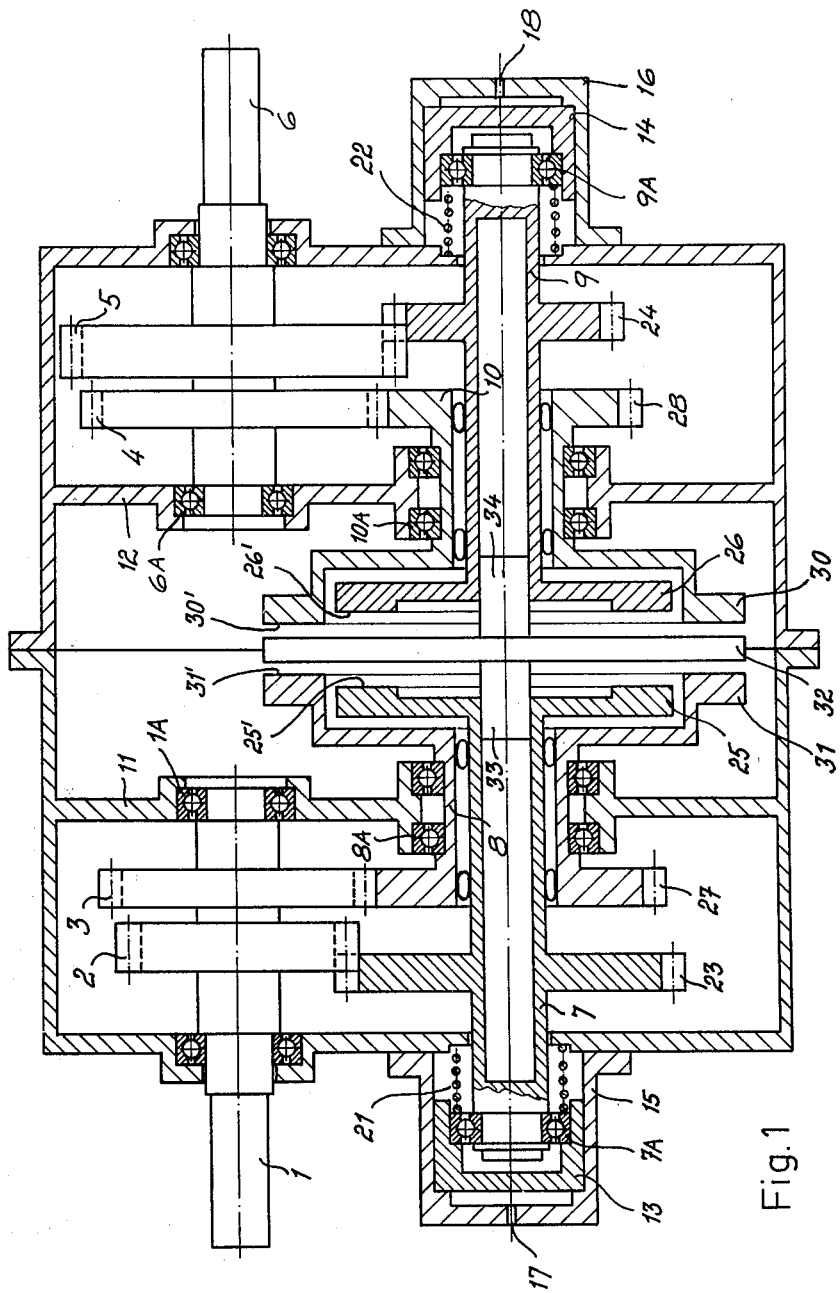

United States Patent [19]

Gött et al.

[11] 4,312,243

[45] Jan. 26, 1982

[54] CHANGE-UNDER-LOAD TRANSMISSION

[75] Inventors: Hans Gött; Josef Ritter; Gerhard Ritter; Klaus Ritter, all of Graz, Austria

[73] Assignee: EVG Entwicklungs -u. Verwertungs-Gesellschaft m.b.H., Graz, Austria

[21] Appl. No.: 147,535

[22] Filed: May 7, 1980

[30] Foreign Application Priority Data

May 9, 1979 [AT] Austria .................................. 3462/79

[51] Int. Cl.³ .............................................. F16H 3/22
[52] U.S. Cl. .................................. 74/346; 192/87.19; 192/87.17; 74/340
[58] Field of Search ..................... 74/346, 340, 343; 192/87.19, 87.17, 87.18, 87.14, 48.91, 51

[56] References Cited

U.S. PATENT DOCUMENTS

| | | | |
|---|---|---|---|
| 2,225,913 | 12/1940 | Lange | 74/346 |
| 2,251,213 | 7/1941 | Lanphere | 74/346 X |
| 2,398,997 | 4/1946 | Berry | 74/346 X |
| 2,445,716 | 7/1948 | Sternberg | 74/346 X |
| 2,635,726 | 4/1953 | Benjamin | 192/51 |

*Primary Examiner*—Nile C. Byers, Jr.
*Attorney, Agent, or Firm*—Ernest F. Marmorek

[57] ABSTRACT

The invention relates to a change-under-load transmission having an input shaft (1) and an output shaft (6), each carrying a pair of gearwheels (2, 3; 4, 5). A composite layshaft comprises two pairs of coaxial shafts (7, 8; 9, 10) which are aligned axially with one another. At their adjacent ends the shafts carry friction coupling elements (25, 31 and 25, 30) which have effective coupling faces (25', 31'; 26' 30'). At their remote ends each of the coaxial shafts carries a gearwheel (23, 27; 24, 28) which is in permanent mesh with an associated one of the gear wheels on the respective input or output shaft. Between the adjacent ends of the two pairs of coaxial shafts a central friction coupling element (32) is positioned so as to be freely slidable axially with respect to the coaxial shafts. Correspondingly positioned ones (7, 9 in FIG. 1; 8, 10 in FIG. 2) of the two pairs of shafts are supported so as to be axially inwardly slidable independently of one another out of a rest position into which they are biassed by springs (21, 22 in FIG. 1; 45, 46 in FIG. 2), and the other shaft (8, 10 in FIG. 1; 7, 9 in FIG. 2) are axially immovable. In the rest position of the shafts the effective coupling faces (30' 31' in FIG. 1, 47' 48' in FIG. 2) of the coupling elements on the slidable shafts are nearer the central coupling disc than the coupling faces (25' 26' in FIG. 1 and 49', 50' in FIG. 2) of the coupling elements on the axially immovable shafts.

6 Claims, 2 Drawing Figures

CHANGE-UNDER-LOAD TRANSMISSION

Known change-under-load transmissions, for example, the automatic tranmissions of motor cars, consist of a combination of a hydrodynamic coupling with one or more sun-and-planet gears, in which case for the selection of the desired reduction ratio or respectively for the selection of the desired direction of drive a system of couplings and brakes is provided by means of which both the input shaft and also the output shaft can be connected optionally to the sun gear, the web gear or the crown gear of the sun-and-planet gear.

The invention is aimed at creating a change-under-load transmission which has a considerably simpler construction than known sun-and-planet change-under-load transmissions and requires neither a hydrodynamic coupling nor brakes for bringing to rest individual gear elements for the gear changing processes.

In accordance with the invention a change-under-load transmission has an input shaft and an output shaft, each carrying a pair of gearwheels; two pairs of coaxial shafts which are aligned axially with one another, the four shafts carrying friction coupling elements at their adjacent ends and gearwheels at their other ends, each of the gearwheels being in permanent mesh with an associated one of the gearwheels on the input or output shaft respectively; and a central friction coupling element between the adjacent ends of the two pairs of coaxial shafts, the central coupling element being freely slidable axially with respect to the pairs of coaxial shafts, correspondingly positioned ones of each of the two pairs of shafts being slidable axially inwards independently of one another out of a rest position and the other two shafts being axially immovable, and the coupling faces of the coupling elements on the slidable shafts lying nearer the central coupling disc that the coupling faces of the coupling elements on the axially fixed shafts.

Preferably the axially slidable shafts are biased by springs into a rest position corresponding to the neutral position of the transmission and can be slid by means of fluid pressure cylinders in the direction towards the central coupling element.

Such a transmission exhibits only simple gearwheels and can be connected under load by simple hydraulic selector means. By series connection of two or more transmission units a large number of speeds, which may also comprise a number of reverse speeds, can be produced.

Figure 2:
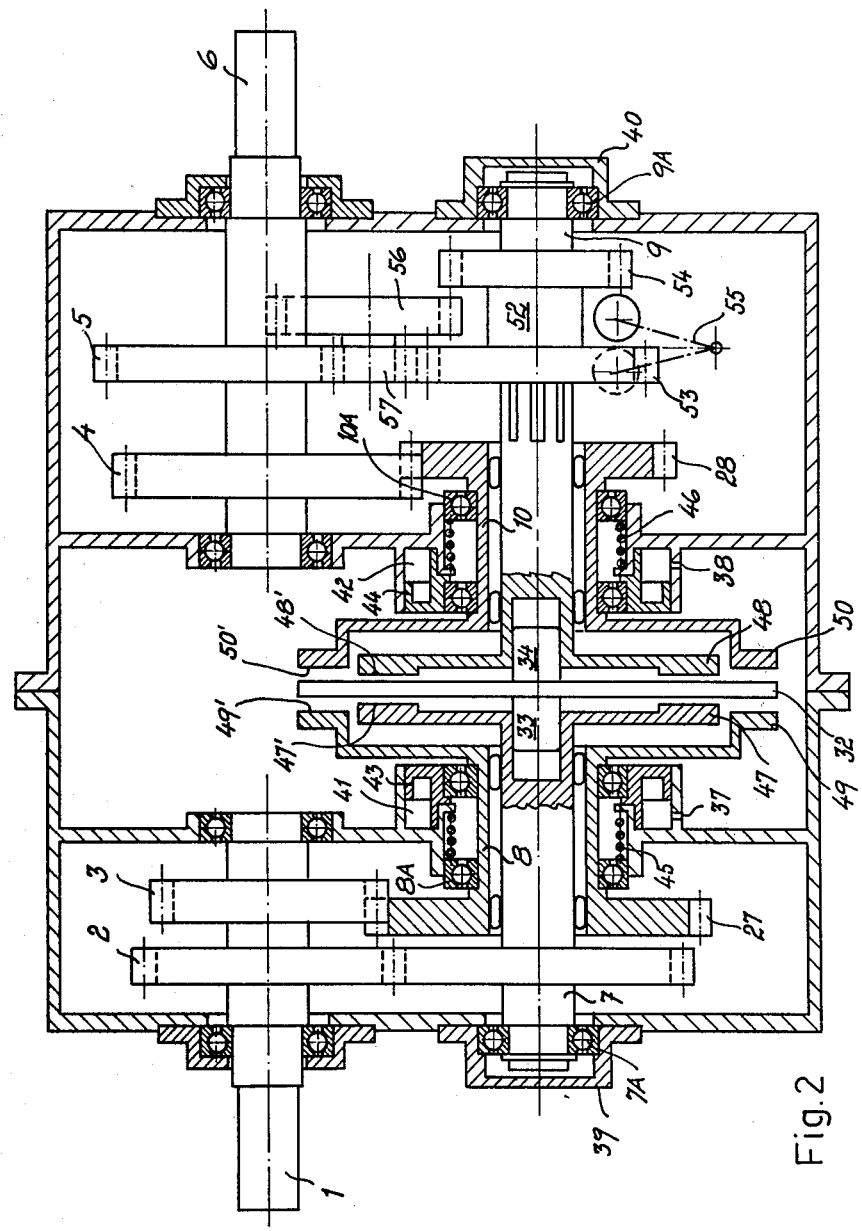

Two examples of transmissions according to the invention will now be described with reference to the accompanying drawings, in which:

FIG. 1 shows, in axial section, a first example in which the inner of the coaxial shafts of the layshaft are slidable axially and the outer shafts are axially immovable; whilst FIG. 2 shows, an embodiment in which as regards the coaxial shafts of the layshafts the reverse conditions exist.

In the example shown in FIG. 1, two gearwheels 2 and 3 are arranged for rotation with and axially immovably on an input shaft 1 which is in permanent engagement with a driving engine (not shown). In the same way two gearwheels 4, 5 are arranged on an output shaft 6 which is in permanent operative connection to the load, say, to a motor car axle or to the driving shaft of a machine tool.

Two pairs of coaxial hollow shafts 7, 8 and 9, 10 form alternatively couplable sections of a layshaft. The inner hollow shafts 7 and 9 are supported so as to be slidable longitudinally with respect to the hollow shafts 8 and 10 which are supported axially immovably in the transmission housing. The outer ends of the inner hollow shafts 7 and 9 rest in ball-bearings 7A, 9A which are fitted into a bore inside respective cylindrical hollow pistons 13, 14. The pistons are guided in cylinders 15, 16 and may be acted upon by pressurized fluid through openings 17, 18 in the cylinder casings. As long as neither of the pistons 13, 14 is being acted upon by pressurized fluid, spiral springs 21, 22 hold each of them, and with them the hollow shafts 7 and 9, in the position shown which is the neutral position of the transmission.

The outer hollow shafts 8 and 10 are supported axially immovably by means of ball-bearings 8A, 10A in intermediate walls 11, 12 in the transmission housing in which walls ball-bearings 1A and 6A respectively are also provided to support the ends of the input shaft 1 and the output shaft, 6 respectively.

A gearwheel 23 is fixedly mounted on the hollow shaft 7 and is in permanent mesh with the gearwheel 2 with respect to which it is slidable longitudinally on movement of the shaft 7. Similarly, a gearwheel 24 is fixedly mounted on the hollow shaft 9 and is in permanent mesh with the gearwheel 5 with respect to which it is slidable longitudinally on movement of the shaft 9.

At its inner end opposite the piston 13 the hollow shaft 7 carries a coupling disc 25 which is rotationally fixed to it. Similarly, the shaft 9 carries at its inner end a corresponding coupling disc 26.

The hollow shafts 8 and 10 carry, at their outer ends, gearwheels 27 and 28 respectively, the gearwheel 27 being permanently in mesh with the gearwheel 3 and the gearwheel 28 permanently in mesh with the gearwheel 4. At their inner ends the hollow shafts 8 and 10 carry coupling discs 31 and 30 respectively which overlap the respective coupling discs 25 and 26 at the inner end of the hollow shaft 7 and 8, in the neutral position of the transmission.

Between the coupling discs 25, 31 on one side and the coupling discs 26, 30 on the other side, a central coupling disc 32 is arranged which is supported rotationally by means of journals 33 and 34 in the hollow shafts 7 and 9 respectively.

It is essential to the invention that the coupling discs 25, 26, 30 and 31 are arranged in such a way that the endfaces 25' and 31' and 26' and 30' which are effective in the coupling process, lie in different planes. In the example of FIG. 1 the distance between the endfaces of the coupling discs 25 and 26 in the neutral position is greater than that between the endfaces of the coupling discs 30 and 31.

The operation of the transmission described is as follows: When the two pistons 13, 14 are acted upon simultaneously by pressurized fluid they are moved together against the pressure of the spiral springs 21, 22. The hollow shafts 7 and 9 are thereby moved together until their respective coupling discs 25, 26 engage opposite sides of the central coupling disc 32. The flow of power in the case of this, the lowest speed, is as follows: Input shaft 1—gearwheel 2— gearwheel 23—shaft 7—coupling disc 25—coupling disc 32—coupling disc 26—shaft 9—gearwheel 24—gearwheel 5—output shaft 6.

If the next higher speed is to be engaged, the pressure in the cylinder 16 is removed. The spiral spring 23 then expands and in doing so returns the piston 14 and with it the shaft 9 and the coupling disc 26 into their rest position.

But since the piston 13 is still under pressure and especially since the central coupling disc 32 now no longer provides any countering pressure, the spiral spring 21 is compressed still more and the shaft 7 and the coupling discs 25 and 32 slide further towards the right. In this movement the coupling disc 25 carries the central coupling disc 32 with it until the latter comes into contact against the coupling disc 30. Now the following path of transmission of power is produced: Input shaft 1—gearwheel 2—gearwheel 23—shaft 7—coupling disc 25—coupling disc 32—coupling disc 30—shaft 10—gearwheel 28—gearwheel 4—output shaft 6.

When the pressure in the cylinder 15 is removed and simultaneously the piston 14 in the cylinder 16 is acted upon by pressurized fluid, the spiral spring 21 moves the piston 13 and all of the parts connected to it back into the rest position. Simultaneously, the piston 14 compresses the spiral spring 22 and moves all of the parts connected to its towards the left. In this movement the coupling disc 26 first of all comes against the central coupling disc 32 and carries it with it in its movement, so that the coupling disc 32 then comes into contact with the coupling disc 31. Now the following path of transmission of power is produced: Input shaft 1—gearwheel 3—gearwheel 27—shaft 8—coupling disc 31—coupling disc 32—coupling disc 26—shaft 9 gearwheel 24—gearwheel 5—output shaft 6. When both cylinders 15 and 16 are simultaneously relieved of fluid pressure then all of the parts return into the rest position shown in FIG. 1, under the action of the spiral springs 21, 22, this position being the neutral position of the transmission.

Summarizing, in the case of relief of pressure in both cylinders 15, 16 the transmission adopts the neutral position; in the case of admission of pressure to both cylinders 15, 16 it works with the highest speed reduction, that is at the lowest e.g., first speed; in the case of the admission of pressure only to the cylinder 15 it works at the second highest reduction, corresponding with the second speed; and in the case of admission of pressure only to the cylinder 16 it words with the smallest reduction corresponding with the third, highest speed.

The transmission in accordance with the invention allows of various structural modifications. For example, in the case of the example of FIG. 2, the inner hollow shafts 7 and 9 are supported axially immovably in bearing bushes 39, 40, whereas the outer hollow shafts 8 and 10 are slidable longitudinally with respect to the hollow shafts 7 and 9.

Close to the inner ends of the hollow shafts 8 and 10 each is provided with an annular chamber 41, 42, the endwall of which next to the coupling discs is formed as a piston 43, 44. The feeding of pressurized fluid to the annular chambers 41, 42 is effected via openings 37, 38. When the pistons 43, 44 are not being acted upon by pressurized fluid spiral springs 45, 46 hold the shafts 8 and 10 in their rest position which corresponds with the neutral position of the transmission.

In this construction the gearwheels 27 and 28 are slidable with respect to the gearwheels 3 and 4, but at the same time they remain permanently in mesh in any possible position of displacement, with the gearwheels 3 and 4.

The shafts 7 and 9 carrying at their adjacent ends coupling discs 47 and 48 respectively and similarly the shafts 8 and 10 carrying coupling discs 49 and 50 respectively. Between these coupling discs a floatingly supported central coupling disc 32 is again arranged, the journals 33, 34 of which are supported in the bores in the shafts 7 and 9.

As distinct from the construction of the transmission as in FIG. 1, in the case of the embodiment as FIG. 2, in the neutral state the distances apart of the endfaces 47', 48' of the coupling discs 47, 48 on the inner hollow shafts 7, 9 are less than the distance between the endfaces 49', 50' of the coupling discs 49 and 50 on the outer hollow shafts.

Thus, in the construction of the transmission, the general rule holds that in the neutral state of the transmission the sum of the distances of the effective coupling faces of the coupling discs slidable in the direction axial to the layshaft from the coupling faces associated with them on the floatingly supported coupling disc must be greater than the sum of the distances of the effective coupling faces of the coupling discs immovable in the direction axial to the layshaft from the coupling faces associated with them on the floatingly supported central coupling disc. The stipulation that it is in that case a question of sums of the distances is essential because this stipulation is valid for any arbitrary position of the floatingly supported central coupling disc 32 even when after selecting back into the neutral state this coupling disc because of a preceding selection process remains in contact with one of the coupling discs 47, 48. The stated rule moreover holds completely generally even when as is altogether conceivable within the scope of the invention, instead of simple coupling discs conical coupling bodies are provided for the transmission of higher powers.

In order finally, in case this should be desired, to be able to provide an optional change of the direction of drive, a hollow shaft 52 is provided which is slidable along the shaft 9, is rotationally fixed to the shaft 9, and which carries at each end of it a gearwheel 53, 54. By means of a preferably hand-actuated gear-shifting gate 55 the hollow shaft 52 may be slid along the hollow shaft 9.

In the position shown in FIG. 2 the gearwheels 5 and 53 are meshing in one another and the direction gear selected is the "forward" direction.

In the "reverse" position the gearwheel 54 is brought into mesh with a reversing gear 56 which by means of an intermediate wheel 57 drives the wheel 5 in the reverse direction.

In reverse the cylinder 43 is acted upon the the flow of power is therefore as follows: Input shaft 1—gearwheel 3—gearwheel 27—shaft 8—coupling disc 49—coupling disc 32—coupling disc 48—shaft 9—gearwheel 54—gearwheel 56—gearwheel 57—gearwheel 5—output shaft 6.

It is possible, for example, by connecting one behind the other a transmission as in FIG. 1 and a transmission as in FIG. 2 to build up a drive which allows the selection of nine "forward" and three "reverse" speeds. Furthermore, it is possible by building up the coupling disc 32 from two parts which are rotationally connected together and can be spread apart hydraulically, to be able to select with otherwise the same transmission a fourth speed in the case of which the flow of power in the FIG. 1 example is as follows: Input shaft 1—gearwheel 3—gearwheel 27 —shaft 8—coupling disc 31— spread central coupling disc pair 32—coupling disc 30—shaft 10—gearwheel 28—gearwheel 4—output shaft 6.

For feeding the transmission with pressurized fluid and for controlling the selection processes known mechanisms may be employed which do not form a part of the invention and therefore are not illustrated or described. By way of example only, the pressure may be built up by means of a gear pump driven directly by the engine.

The admission of pressurized fluid to the piston or pistons desired at the time may be effected by appropriate electrical control of solenoid valves. Advantageously a pre-programmed pressure regulating device is also inserted in the pressure supply, which after any selection process ensures a slow build-up of the pressure in the pressure lines and hence gentle coupling-in of the gearwheel combination corresponding with the selection made.

We claim:

1. A change-under-load transmission having an input shaft and an output shaft; a pair of gearwheels on each of said input and output shafts; two pairs of coaxial shafts, said pairs of coaxial shafts being aligned axially with one another; a friction coupling element at the end of each of said coaxial shafts adjacent the other pair of coaxial shafts, said coupling element having a coupling face, and a gearwheel at the other end of each of said coaxial shafts, said gearwheels being adapted to be in permanent mesh with an associated one of said gearwheels on said input or output shaft respectively; and a central friction coupling element disposed between the adjacent ends of said two pairs of coaxial shafts, said central coupling element being adapted to be freely slidable axially with respect to said pairs of coaxial shafts; correspondingly positioned ones from said pairs of coaxial shafts being slidable axially inwards independently of one another out of a rest position, and the other shaft of each of said coaxial pairs being axially immovable; and said coupling faces of said coupling elements on said slidable shafts being disposed nearer said central coupling element than said coupling faces of said coupling elements on said axially immovable shafts.

2. A transmission according to claim 1, further comprising spring means biassing said axially slidable shafts into said rest position, said rest position corresponding to the neutral position of said transmission, and fluid pressure cylinder means operable to cause each of said shafts to be movable in the direction towards said central coupling element.

3. A transmission according to claim 1, further comprising means axially journalling said central coupling element in bores in said inner ones of said coaxial pairs of shafts, whereby said central coupling element is freely slidably supported.

4. A transmission according to claim 1, further comprising ball bearing means supporting the outer ends of each of said inner ones of said coaxial pairs of shafts.

5. A transmission according to claim 1, wherein said axially immovable shafts comprise the inner ones of said coaxial pairs, and further comprising reversing gearwheel means for coupling one of said inner shafts to an associated gearwheel on said input or output shaft.

6. A transmission assembly comprising a pair of transmission assemblies according to claim 1, wherein, in one of the transmissions, said axially immovable shafts comprise the inner ones of said coaxial pairs, and said one transmission further comprising reversing gearwheel means for coupling one of said inner shafts to an associated gearwheel on said input or output shaft.

* * * * *